(12) United States Patent
Chen

(10) Patent No.: US 10,348,558 B2
(45) Date of Patent: Jul. 9, 2019

(54) METHOD AND SYSTEM FOR RESTARTING NETWORK SERVICE WITHOUT PACKET LOSS AND WITH ZERO DOWNTIME

(71) Applicant: WANGSU SCIENCE & TECHNOLOGY CO., LTD., Shanghai (CN)

(72) Inventor: Xun Chen, Shanghai (CN)

(73) Assignee: WANGSU SCIENCE & TECHNOLOGY CO., LTD, Shanghai (CN)

( * ) Notice: Subject to any disclaimer, the term of this patent is extended or adjusted under 35 U.S.C. 154(b) by 30 days.

(21) Appl. No.: 15/552,216

(22) PCT Filed: May 30, 2016

(86) PCT No.: PCT/CN2016/083903
§ 371 (c)(1),
(2) Date: Aug. 18, 2017

(87) PCT Pub. No.: WO2017/121063
PCT Pub. Date: Jul. 20, 2017

(65) Prior Publication Data
US 2018/0069755 A1     Mar. 8, 2018

(30) Foreign Application Priority Data
Jan. 15, 2016    (CN) .......................... 2016 1 0028287

(51) Int. Cl.
*H04L 12/24*       (2006.01)
*G06F 9/445*       (2018.01)
(Continued)

(52) U.S. Cl.
CPC ...... *H04L 41/0813* (2013.01); *G06F 9/44505* (2013.01); *H04L 41/5041* (2013.01);
(Continued)

(58) Field of Classification Search
None
See application file for complete search history.

(56) References Cited

U.S. PATENT DOCUMENTS 6,634,025 B1    10/2003    Hauptmann et al.
7,437,606 B2    10/2008    Janakiraman et al.
(Continued)

FOREIGN PATENT DOCUMENTS

| CN | 104461628 A | 3/2015 |
| CN | 105100232 A | 11/2015 |
| CN | 105450782 A | 3/2016 |

OTHER PUBLICATIONS

Zero-Downtime Restarts with HAProxy—LLya Grigorik—Dec. 2, 2008 (Year: 2008).*
(Continued)

*Primary Examiner* — Younes Naji
(74) *Attorney, Agent, or Firm* — Anova Law Group, PLLC

(57) ABSTRACT

The present disclosure discloses a method and system for restarting the network service with zero downtime, comprising: a) listening, by an original process of the network service, on a first port; (b) configuring and initiating a transition process, wherein the configuring includes causing the transition process to listen on a second port different from the first port of the original process; (c) running a connection tracking module and, meanwhile adding an iptables rule to redirect a connection directed to the first port to the second port; (d) waiting until existing connections on the original process are processed completely, then exiting the original process; (e) initiating a new process on the first port according to a new configuring file; (f) reconfiguring the iptables rule to cancel port redirection; and (g) waiting
(Continued)

until existing connections on the transition process are processed completely, then exiting the transition process.

14 Claims, 2 Drawing Sheets

(51) Int. Cl.
  *H04L 12/741* (2013.01)
  *H04L 29/08* (2006.01)
(52) U.S. Cl.
  CPC .......... *H04L 41/5077* (2013.01); *H04L 45/74* (2013.01); *H04L 69/30* (2013.01)

(56) References Cited

U.S. PATENT DOCUMENTS

| | | | |
|---|---|---|---|
| 7,930,733 B1* | 4/2011 | Iftode | G06F 21/52 711/152 |
| 2015/0156183 A1 | 6/2015 | Beyer et al. | |
| 2015/0256477 A1* | 9/2015 | Bragstad | H04L 43/04 709/226 |

OTHER PUBLICATIONS

Justin Ellingwood—"A Deep Dive into Iptables and net-filter Architecture" (Year: 2015).*
Derek Lewis—True Zero Downtime HAproxy Reloads : An Alternative Approach (Year: 2015).*
Pablo Neira Ayuso—The Conntrack—Tools user manual (Year: 2012).*
Victor—Netfilter /IPtables—Why not using the raw table ?—(Year: 2015).*
The European Patent Office (EPO) The Extended European Search Report for 16884622.8 dated Jul. 25, 2018 11 Pages.
Derek Lewis True Zero Downtime HAProxy Reloads: An Alternative Approach Apr. 15, 2015 XP055493310 URL:https://inside.unbounce.com/product-dev/haproxy-reloads/.
Joseph Lynch True Zero Downtime HAProxy Reloads Apr. 13, 2015 pp. 1-7 XP055489423.
The World Intellectual Property Organization (WIPO) International Search Report for PCT/CN2016/083903 dated Oct. 25, 2016 4 Pages.

* cited by examiner

METHOD AND SYSTEM FOR RESTARTING NETWORK SERVICE WITHOUT PACKET LOSS AND WITH ZERO DOWNTIME

CROSS-REFERENCES TO RELATED APPLICATIONS

This application is a national stage patent application of PCT application No. PCT/CN2016/083903, filed on May 30, 2016, which claims priority to Chinese Patent Application No. 201610028287.8, filed on Jan. 15, 2016, the entire content of all of which is incorporated herein by reference.

FIELD OF THE INVENTION

The present disclosure relates to network service restarting technologies, and more specifically, relates to a method and system for restarting a network service with zero such that, when restarting the network service, not only all the new downtime connections can be processed correctly, but also no connection interruption will be resulted.

BACKGROUND

In various existing network services, some network services have to restart the process in order to complete the restart or to reload configuration files. A typical example is HAProxy network service, which is often provided in many heavily loaded web sites. By adopting the SO_REUSEPORT option, HAProxy network service binds a new process to the same IP address and the same port as the original process, to wait for the new connections. Then, HAProxy network service sends a signal to notice the original process to shut down the socket on the listening port. However, during a short time period in which both the new and original processes are bound to the same IP address and the same port while the listening socket for the original process has not been closed yet, new connections may arrive. According to the implementation of SO_REUSEPORT in Linux kernel, the first packet of a new connection (Synchronize packet, SYN packet) may be assigned to any one of the original and new processes. If the SYN packet/packet is assigned to the original process while the listening socket for the original process is shut down, according to the TCP protocol, the server sends a TCP reset (RST) packet to the client to reset the connection, which may cause a normal connection to be reset unconditionally. Although the client may relaunch the connection, such a connection relaunch undoubtedly increases the time required for the entire data transmission and, meanwhile, increases the unnecessary burden to the network lines between the client and server. In addition to the above-mentioned HAProxy network service, many other network services also encounter the same problem, i.e., having to restart the process to complete the restart or to reload the configuration file, such as NginX network services, and the like.

To solve the above-mentioned problem in the network services, several solutions have been provided. One simple solution is to discard the received new SYN packet by configuring iptables rule when reloading the process. According to the TCP protocol, if the client does not receive SYN-ACK message, after a certain time period, the client will resend the SYN packet. Thus, the resent SYN packet may be successfully received by the new process which has been reloaded, thereby solving the above-mentioned problem. However, the disadvantage of this solution is that the client has to wait for certain time until the timeout occurs, before resending the SYN packet. The waiting time is often substantially long, for example, more than 1 second, while the time for reloading the process requires only tens of milliseconds. Thus, the new process which has been reloaded may have to wait, for example, about 1 second to receive the resent SYN packet. Therefore, in this solution, although the new connection is not going to be reset, a longer time delay may be introduced.

Another applicable existing solution is to utilize Linux flow control tools (TC). First, iptables are adopted to label the new incoming SYN packets, then the TC tool is adopted to temporarily cache these packets. After the process completes the reloading, the SYN packets are released. Compared to the previous solution, this solution may have a relatively short time delay. However, because the TC tool is only capable of controlling the outbound traffic, the corresponding application scenarios may be rather limited. For example, when the service process may work as a daemon process to monitor and receive the client connection, and the SYN packet is the incoming traffic, the solution based on TC tool may be unable to solve the above-mentioned problem.

Thus, techniques capable of providing a restart network service with advantages such as no time delay, available for both outgoing and incoming connections, and unrestricted application scenarios, etc., are highly desired.

BRIEF SUMMARY OF THE DISCLOSURE

To solve the above-mentioned defects in the prior arts, the present disclosure provides a method and system for restarting network service without packet loss and with zero downtime. Compared with other existing methods, the disclosed method and system may have various advantages, such as no time delay, available for both outgoing and incoming connections, and unrestricted application scenarios, etc.

One aspect of the present disclosure provides a method for restarting a network service. The method comprises:

a) listening, by an original process of the network service, on a first port;

b) configuring and initiating a transition process, wherein the configuring includes causing the transition process to listen on a second port different from the first port of the original process;

c) running a connection tracking module and, meanwhile adding an iptables rule to redirect a connection directed to the first port to the second port, such that subsequent connections that would otherwise be connected to the first port are redirected to the second port of the transition process;

d) waiting until existing connections on the original process are processed completely, then exiting the original process;

e) initiating a new process on the first port according to a new configuring file;

f) reconfiguring the iptables rule to cancel port redirection, such that subsequent new connections that would otherwise be connected to the first port are no longer redirected but are still connected to a new process listening on the first port; and g) waiting until existing connections on the transition process are processed completely, then exiting the transition process.

Another aspect of the present disclosure provides a system for restarting a network service. The system comprises:

a server, configured to provide a plurality of network services;

a client, configured to request the server to restart a network service;

a network environment, configured to realize data communicate between the server and the client, wherein the server is configured to perform the following steps to restart the network service:

a) listening, by an original process of the network service, on a first port;

b) configuring and initiating a transition process, wherein the configuring includes causing the transition process to listen on a second port different from the first port of the original process;

c) running a connection tracking module and, meanwhile adding an iptables rule to redirect a connection directed to the first port to the second port, such that subsequent connections that would otherwise be connected to the first port are redirected to the second port of the transition process;

d) waiting until existing connections on the original process are processed completely and exiting the original process;

e) initiating a new process on the first port according to a new configuring file;

f) reconfiguring the iptables rule to cancel port redirection, such that subsequent new connections that would otherwise be connected to the first port are no longer redirected but are still connected to a new process listening on the first port; and g) waiting until existing connections on the transition process are processed completely and exiting the transition process.

The brief summary section of the present disclosure is provided to introduce a selection of concepts, which are further described in the following detailed description, in a simplified form. The brief summary section of the present disclosure is not intended to identify key features or essential features of the claimed subject matter, nor is it intended to be used as an aid in determining the scope of the claimed subject matter.

BRIEF DESCRIPTION OF THE DRAWINGS

In order to describe the approaches through which the abovementioned and other advantages and features of the present disclosure may be obtained, a more specific description of the present disclosure which is briefly described above will be presented by reference to various disclosed embodiments shown in the accompanying drawings. It would be understood that the following drawings are merely examples for illustrative purposes according to various disclosed embodiments and are not intended to limit the scope of the present disclosure. The present disclosure will be described and illustrated by the accompanying drawings and additional features and details, in which.

DETAILED DESCRIPTION

The present disclosure will be further described in the following with reference to the accompanying drawings and exemplary embodiments.

Figure 1:
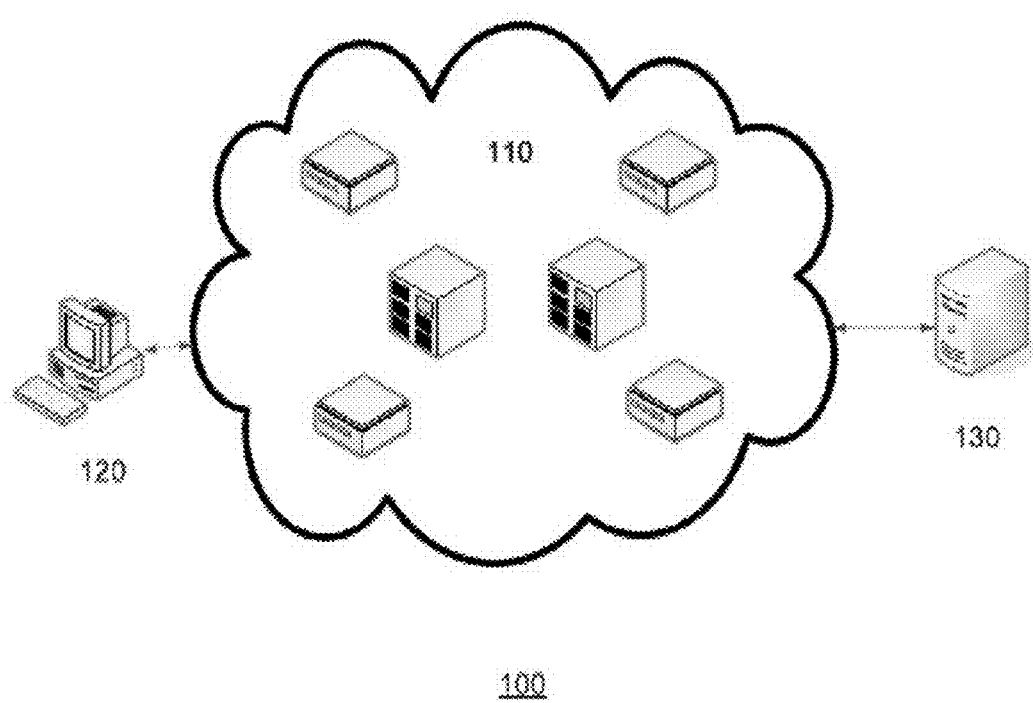
FIG. 1 illustrates an exemplary environment incorporating certain embodiments of the present d.

First, a system environment implemented with the embodiments of the present disclosure is described. FIG. 1 illustrates an exemplary environment 100 incorporating certain embodiments of the present disclosure. The environment 100 may include a client (client device) 120 and a server (server device) 130 which communicate with each other through a network environment 110. The network environment in which the client and server are located may be a local area network (LAN), Internet, or other wide area networks (WANs). The server 130 may be a web site configured to provide various network services, such as HAProxy network service, in which the network service may have to restart the process to complete the restart or to reload the configuration file. The client 120 may be configured to request the network service from the server 130 through the Internet 110.

Having introduced the exemplary environment of the present disclosure, the principles of the present disclosure will be described.

First, Netfilter is a subsystem in the Linux kernel and is related to network functionality. As a general and abstract framework, Netfilter may be configured to provide packet filtering, packet modification, Network Address Translation (NAT), and other functions.

Connection tracking (CONNTRACK) mechanism is an important function in the Netfilter framework, and is the basis for the packet filtering and address translation. The basic function of CONNTRACK is to track and record the connection status. CONNTRACK runs as a standalone module. Through capturing data packets in the lower level of the protocol stack and comparing the current data packet and its status information with the historical data packet and its status information, control information of the current data packet may be obtained. Based on the control information of the current data packet, the operation of the network data packet may be determined and, thus, the network may get protected. Specifically, the Netfilter framework in Linux may generate a new connection entry for each first packet of a new connection that passes through network stack. Then all packets belonging to this connection may be uniquely assigned to this connection and may be identified with the connection status. CONNTRACK is the basis for Netfilter to achieve the status inspection, and is a prerequisite for achieving Network Address Translation (NAT).

After an underlying network receives a synchronization (SYN) packet, the SYN packet may be checked by the Netfilter rules. The SYN packet may be compared in order in the rule chain. If the SYN packet has to be discarded, a Reset (RST) packet may be sent to a remote host, otherwise the connection is received. The connection information may be stored in the CONNTRACK information table, and may indicate the status of the SYN packet. The CONNTRACK information table may be in kernel mode, the subsequent network packets may be compared with the contents of the CONNTRACK information table, and the operation of the subsequent network packet may be determined according the information in the CONNTRACK information table. Because the packet is first compared with the CONNTRACK information table, only the SYN packet may be compared with the rule base, and the comparison between the packet and the CONNTRACK information table is done in kernel mode, leading to a substantially fast processing speed.

The present disclosure takes benefits of the features of the connection tracking system of Netfilter: according to the implementation of the connection tracking system, the correlation rule may only match the first packet of each connection, while the subsequent packets may be automatically processed by the connection tracking system, based on which new connections may be distinguished from the old connections. All the new connections may be directed to the new process, while the old connections on the original process may not be effected.

However, for performance consideration, many online servers may turn off the connection tracking system. Thus, in the present disclosure, when the network service is reloaded, the connection tracking system may have to be temporarily turned on for switching the process. In the detailed steps shown in FIG. 2, the connection tracking system is assumed to be turned off when the server is running.

Figure 2:
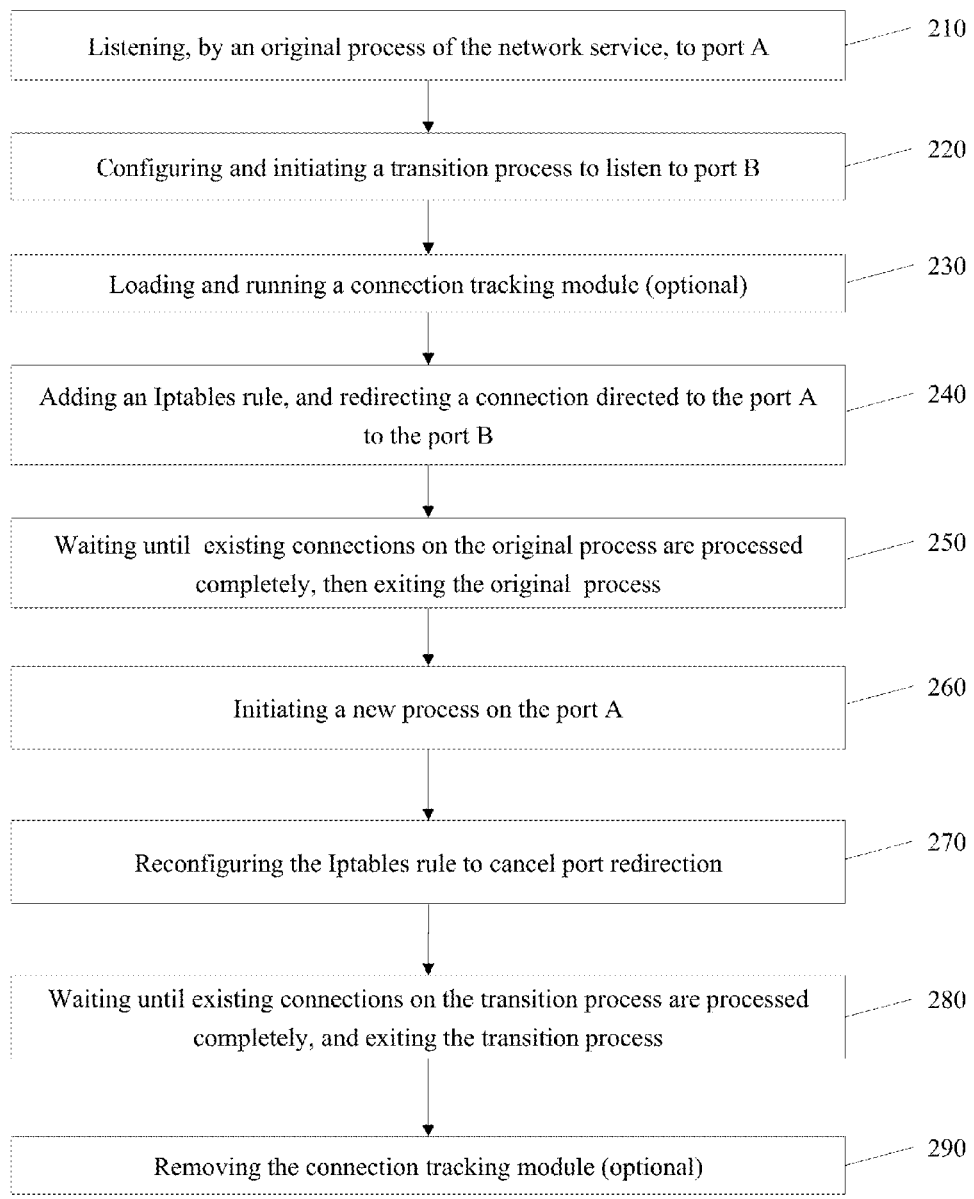
FIG. 2 illustrates a flow chart of an exemplary method of restarting a network service with zero downtime consistent with disclosed embodiments.

Now referring to FIG. 2, FIG. 2 illustrates a flow chart of an exemplary method 200 of restarting a network service with zero downtime consistent with disclosed embodiments.

First, in Step 210, an original process of the network service is assumed to listen on port A. It should be noted that, the port A is simply a port name for convenient description and is not intended to restrict the process to a particular port.

When the network service is reloading and a process switch is required, in Step 220, a transition process is configured and started. The configuration file of the network service may be modified, the transition process may be configured to listen on a port different from the original process, and the transition process may be started. Here the transition process is assumed to listen on port B. As described above, the port B is only for convenience in describing a port different from the port A, and is not intended to restrict the process to a particular port.

Because the connection tracking system is assumed to be turned off when the server is running, in Step 230, the connection tracking module is loaded and kept running. Thus, the subsequent additions of iptables DNAT rules may be able to work normally. It should be noted that, if the connection tracking system has been already turned on when the server is running, Step 230 may be omitted, and the disclosed method may directly go to the next step.

Next, in Step 240, the iptables rule are configured by the connection tracking module, such that the connection originally directed to the port A is redirected to the port B, for example, by adding a redirecting iptables rule by entering the following command:

iptables -A PREROUTING eth0 -t nat -p tcp --dport $A --syn -j DNAT --to 1.2.3.4:$B The specific meaning of each parameter in the above command is explained as follows:

-A PREROUTING: adding the rule to the PREROUTING chain
-i eth0: assigning the network device as eth0
-t nat: adding the rule to the nat table
-p tcp: assigning the protocol as TCP
--dport $A: the destination port is port $A
--syn: matching SYN packet
-j DNAT --to 1.2.3.4: $B: redirecting the packet to IP 1.2.3.4, port $B After configuring the redirecting iptables rule, the new connection which would otherwise be connected to the port A may be redirected to the transition process listening on the port B. Meanwhile, because of the characteristics of the connection tracking system, the existing connections on the original process may continue to be processed without being affected by the redirecting iptables rule.

At this moment, because the new connections are all redirected to the transition process listening on the port B, the original process may no longer receive any new connections. Thus, in Step 250, after all the existing connections on the original process have been processed, the original process exits.

After the original process exits, the port A may be no longer in use. Thus, in Step 260, a new configuration file is adopted to start a new process to listen on the port A. However, due to the effect of the iptables rule, the new process may temporally not receive a new connection, because the new connections are redirected to the port B to monitor the transition process.

Subsequently, after the new process is started, in Step 270, the iptables rule is reconfigured and, thus, the port redirection of the port A to the port B is cancelled. For example, the following command may be executed to cancel the previously configured redirecting iptables rule:

iptables -D PREROUTING eth0 -t nat -p tcp --dport $A --syn -j DNAT --to 1.2.3.4:$B The specific meaning of each parameter in the above command is explained as follows:

-D PREROUTING: deleting the rule from the PREROUTING chain
-i eth0: assigning the network device as eth0
-t nat: adding the rule to the nat table
-p tcp: assigning the protocol as TCP
--dport $A: the destination port is port $A
--syn: matching SYN packet
-j DNAT --to 1.2.3.4: $B: redirecting the packet to IP 1.2.3.4, port $B It should be noted that the above-described commands and the parameters are for illustrative purposes only, and are not intended to limit the scope of the present disclosure. Those skilled in the art would easily adjust the parameters to achieve the desired redirection and cancel the redirection, according to actual situations and requirements.

After the command for canceling the redirection is executed, the subsequent new connection may be all directed to the port A of the new process. That is, all new connections thereafter may be processed by the new process listening on the port A, while the connections on the transition process may continue to be processed without being affected.

At this moment, because the new connections are all redirected to the port A of the new processes, the transition process may no longer receive any new connections. Thus, in Step 280, after all the existing connections on the transition process have been processed, the transition process exits.

Heretofore, because the mission of the connection tracking module has been completed, in order to not affect the performance of the server, in Step 290, the connection tracking module may be removed to save system resources. If the connection tracking system has been running on the server by default, this step may be omitted, and the connection tracking module may continue running.

Thus, the switching process between the new and original process is completed. During the entire network service reloading process, because the transition process, which is configured to handle new connections received by the new and original process in switching gaps, is provided, the present disclosure may provide the following major advantages:

1. Restarting the network service may not introduce a delay in the establishment of a new incoming connection.
2. Valid for both outgoing and incoming connections.
3. iptables is a configuration tool for configuring an application layer rule configuration tool in Netfilter. The present disclosure may be realized by using a series of iptables commands without modifying the source code of the kernel or network service program.

The steps in the above process have been used and verified during the reloading of the Haproxy network service. By adopting the disclosed method, the Haproxy network services will not reset the new connection during the reloading, and delay is not introduced into the establishment of new connections. While the advantages of the solution provided by the present disclosure has been proven in the Haproxy network services, the solution provided by the present disclosure is not limited to the Haproxy network services. For other network services in which the process has to be restarted to complete the restart or to reload the configuration file, the disclosed method and system may also be able to realize a reloading with zero downtime, which is not described here in detail in the interest of saving space.

Although the exemplary embodiments are implemented in the Linux environment, the technical solution provided in the present disclosure may also be applied to other Linux-based operating system environments, such as Android operating system, and Openwrt operating system, etc.

The description of the disclosed embodiments is provided to illustrate the present disclosure to those skilled in the art. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A method for restarting a network service, comprising:
    (a) listening, by an original process of the network service, for a request to restart the network service on a first port;
    (b) in responding to the request to restart the network service, configuring and initiating a transition process, wherein the configuring includes causing the transition process to listen on a second port different from the first port of the original process;
    (c) in responding to initiating the transition process, running a connection tracking module, meanwhile adding an iptables rule to redirect a connection directed to the first port to the second port, and redirecting subsequent connections that would otherwise be connected to the first port to the second port of the transition process;
    (d) waiting until existing connections on the original process are processed completely, then exiting the original process;
    (e) initiating a new process on the first port according to a new configuring file;
    (f) reconfiguring the iptables rule to cancel port redirection, wherein the wherein the reconfiguring includes causing that subsequent new connections that would otherwise be connected to the first port are no longer redirected but are still connected to a new process listening on the first port; and
    (g) waiting until existing connections on the transition process are processed completely, and exiting the transition process.

2. The method for restarting a network service according to claim 1, further including:
    when a server has turned off a connection tracking system before restarting the network service, before performing step (c), loading a connection tracking module to start the connection tracking system, for the iptables rule to work.

3. The method for restarting a network service according to claim 2, further including:
    after performing step (g), removing the connection tracking module to improve performance of the server.

4. The method for restarting a network service according to claim 1, wherein: the connection tracking module is a functional module in Netfilter framework, and is configured to: generate a new connection entry for each first packet of a new connection that passes through network stack, assign all packets belonging to the new connection to the new connection uniquely, and identify all the packets belonging to the new connection with a connection status.

5. The method for restarting a network service according to claim 1, wherein, provided that the first port is called a port A and the second port is called a port B, adding the iptables rule to redirect is by the following command:
    iptables -A PREROUTING -i eth0 -t nat -p tcp --dport $A --syn - j DNAT --to 1.2.3.4: $B;
    and removing the iptables rule to redirect is by the following command: iptables -D PREROUTING -i ethO -t nat -p tcp --dport $A --syn -j DNAT --to 1.2.3.4: $B.

6. The method for restarting a network service according to claim 4, wherein, the Netfilter framework is a subsystem of Linux kernel associated with network functions, and the Netfilter framework provides functions of packet filtering, packet modification, and network address translation.

7. The method for restarting a network service according to claim 1, wherein, the network service is a HAProxy network service or a Nginx network service.

8. A system for restarting a network service, comprising:
    a server, configured to provide a plurality of network services;
    a client, configured to request the server to restart a network service; a network environment, configured to realize data communicate between the server and the client, wherein the network environment includes local area networks (LANs), Internet, or other wide area networks (WANs),
    wherein the server is configured to perform the following steps to restart the network service:
    (a) listening, by an original process of the network service, for a request to restart the network service on a first port;
    (b) in responding to the request to restart the network service, configuring and initiating a transition process, wherein the configuring includes causing the transition process to listen on a second port different from the first port of the original process;
    (c) in responding to initiating the transition process, running a connection tracking module, adding an iptables rule to redirect a connection directed to the first port to the second port, and redirecting subsequent connections that would otherwise be connected to the first port to the second port of the transition process;
    (d) waiting until existing connections on the original process are processed completely, and exiting the original process;
    (e) initiating a new process on the first port according to a new configuring file;
    (f) reconfiguring the iptables rule to cancel port redirection, wherein the reconfiguring includes causing that subsequent new connections that would otherwise be connected to the first port are no longer redirected but are still connected to a new process listening on the first port; and (g) waiting until existing connections on the transition process are processed completely, then exiting the transition process.

9. The system for restarting a network service according to claim 8, wherein:

when the server has turned off a connection tracking system before restarting the network service, before performing step (c), the server is configured to load a connection tracking module to start the connection tracking system, for the iptables rule to work.

10. The system for restarting a network service according to claim 9, wherein:

after performing step (g), the server is further configured to remove the connection tracking module to improve performance of the server.

11. The system for restarting a network service according to claim 8, wherein:

the connection tracking module is a functional module in Netfilter framework, and is configured to: generate a new connection entry for each first packet of a new connection that passes through network stack, assign all packets belonging to the new connection to the new connection uniquely, and identify all the packets belonging to the new connection with a connection status.

12. The system for restarting a network service according to claim 8, wherein provided that the first port is called a port A and the second port is called a port B, the server is configured to add the iptables rule to redirect is by the following command: iptables -A PREROUTING -i eth0 -t nat -p tcp --dport $A --syn - j DNAT --to 1.2.3.4: $B;

and the server is configured to remove the iptables rule to redirect is by the following command: iptables -D PREROUTING -i eth0 -t nat -p tcp --dport $A --syn -j DNAT --to 1.2.3.4: $B.

13. The system for restarting a network service according to claim 11, wherein, the Netfilter framework is a subsystem of Linux kernel associated with network functions, and the Netfilter framework provides functions of packet filtering, packet modification, and network address translation.

14. The system for restarting a network service according to claim 8, wherein, the network service is a HAProxy network service or a Nginx network service.

\* \* \* \* \*